2,108,122
Patented Oct. 22, 1963

3,108,122
NEW 1-ACYL-1-(2-CHLOROETHYL)-2-(5-NITRO-FURFURYLIDENE)HYDRAZINES
Frank F. Ebetino, Norwich, N.Y., assignor to The Norwich Pharmacal Company, Norwich, N.Y., a corporation of New York
No Drawing. Filed Feb. 23, 1960, Ser. No. 10,039
3 Claims. (Cl. 260—347.3)

This invention relates to a new series of chemical compounds which possess a high order of chemotherapeutic activity upon oral administration to infected hosts in far less than toxic doses, to the production thereof, and to a new compound that is particularly useful as an intermediate in the preparation of a member of my new series of chemotherapeutic agents. Such series may be characterized as 1-acyl-1-(2-chloroethyl)-2-(5-nitrofurfurylidene)hydrazines and may be represented by the formula:

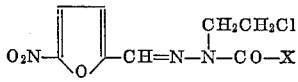

in which X represents a member of the group consisting of amino and methyl.

I have discovered that the members of the new series of compounds which I have invented are systemic therapeutic agents when administered to an infected host in doses which are tolerated without adverse response. Chickens infected with Eimeria tenella, the causative agent of cecal coccidiosis, are protected against the morbidity and mortality provoked by that disease through the administration of members of my series in their feed supply in an amount of 0.011% by weight. Mice lethally infected with Staphylococcus aureus are successfully treated with members of my series; a single dose of 210 mg./kg. serving to protect 60% against death.

The new chemical compound which I have found to be a valuable intermediate for the preparation of a member of my new series is 1-acetyl-1-(2-hydroxyethyl)-2-(5-nitrofurfurylidene)hydrazine. It also exhibits systemic therapeutic activity against Eimeria tenella when administered orally to chickens, and against Staphylococcus aureus when administered orally to mice. The new chemotherapeutic agent that is prepared therefrom is 1-acetyl-1-(2-chloroethyl) - 2 - (5-nitrofurfurylidene)hydrazine.

My new compounds can be readily formulated and compounded in appropriate dosage form such as tablets, suspensions, capsules and the like through the use of excipients and adjuvants common in the art. They may be readily subjected to the commonly employed dosage techniques of veterinary medicine by incorporation in the feed or drinking water supply.

It is a particular feature of my invention that my new 1-acyl-1-(2-chloroethyl)-2-(5-nitrofurfurylidene)hydrazine compounds can be prepared in a facile manner from a readily available starting compound, namely, 2-hydroxyethylhydrazine:

(1) The 1-carbamyl-1-(2-chloroethyl)-2-(5-nitrofurfurylidene)hydrazine that I have invented can be prepared by subjecting the starting compound, 2-hydroxyethylhydrazine, to cyanation to form the semicarbazide which is condensed with 5-nitrofurfural. The product of this condensation is then subjected to treatment with thionyl chloride to provide the desired end product.

(2) In the preparation of 1-acetyl-1-(2-chloroethyl)-2-(5-nitrofurfurylidene)hydrazine, the starting compound, 2-hydroxyethylhydrazine, is condensed with 5-nitrofurfural to yield 5-nitrofurfurylidene-2-hydroxyethylhydrazone. That hydrazone is then acetylated by subjecting it to treatment with acetic anhydride under the influence of heat to produce 1-acetyl-1-(2-hydroxyethyl)-2-(5-nitrofurfurylidene)hydrazine which, when treated with thionyl chloride, yields the desired end product.

In the preparation of my new compounds as summarized above, I may use in lieu of 5-nitrofurfural a derivative thereof such as 5-nitrofurfural diacetate which, under the reaction conditions, is hydrolyzable to 5-nitrofurfural.

In order that my invention may be fully available to those skilled in the art, the following illustrative examples are given:

EXAMPLE I

1-Carbamyl-1-(2-Chloroethyl)-2-(5-Nitrofurfurylidene)Hydrazine

To a suspension of 5-nitro-2-furaldehyde 2-(2-hydroxyethyl)semicarbazone in dry benzene is added with stirring and with heating thionyl chloride at such a rate as to maintain a temperature of 40–45° C. within the reaction vessel. After cessation of the evolution of gas, the suspension is heated at 55–65° C. for one hour. The mixture is cooled and the N-(5-nitro-2-furfurylidene)-3-amino-2-iminooxazolidine hydrochloride filtered.

The N-(5-nitro-2-furfurylidene)-3-amino-2-iminooxazolidine hydrochloride (86 g.) in 2 liters of xylene is heated at reflux for about thirty minutes. The orange solid is filtered and washed with ether, water and ethanol. There are obtained 178 g. (96%) of 1-carbamyl-1-(2-chloroethyl) - 2 - (5-nitrofurfurylidene)hydrazine; M.P. 194–196° C. It may be recrystallized from acetonitrile.

EXAMPLE II

1-Acetyl-1-(2-Chloroethyl)-2-(5-Nitrofurfurylidene)Hydrazine

A. One hundred and seven gm. (0.54 mole) of 5-nitrofurfurylidene 2-hydroxyethyl hydrazone is dissolved in 750 cc. acetic acid and heated at 75–110° C. for 30 min. with 55 gm. (0.54 mole) of acetic anhydride. The mixture is poured over ice and neutralized with saturated $Na_2CO_3$ to precipitate the yellow product. This is filtered and may be recrystallized from benzene to yield 78 gm. (60%) of 1-acetyl-1-(2-hydroxyethyl)-2-(5-nitrofurfurylidene)hydrazine; M.P. 115–116° C.

B. To 25 ml. of thionyl chloride is added 10 g. of 1-acetyl-1-(2-hydroxyethyl) - 2 - (5-nitrofurfurylidene)-hydrazine with stirring over a ten minute period. Very shortly a solid starts to separate. The mixture is poured into 100 ml. of benzene. The solid is filtered, washed with benzene and dried. The yield of 1-acetyl-1-(2-chloroethyl)-2-(5-nitrofurfurylidene)hydrazine is 8.5 g. (79%); M.P. 141–146° C. Recrystallization from isopropanol or benzene raises M.P. to 145.5–146.5° C.

What I claim is:
1. A chemical compound having chemotherapeutic ac- tivity upon oral administration and represented by the formula:

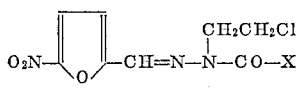

in which X represents a member of the group consisting of amino and methyl.

2. The chemical compound 1-carbamyl-1-(2-chloroethyl)-2-(5-nitrofurfurylidene)hydrazine represented by the formula:

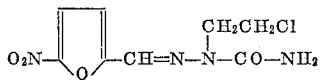

3. The chemical compound 1-acetyl-1-(2-chloroethyl)-2-(5-nitrofurfurylidene)hydrazine represented by the formula:

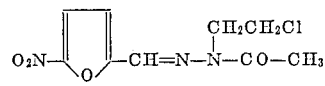

References Cited in the file of this patent

UNITED STATES PATENTS 2,416,234    Stillman et al.            Feb. 18, 1947
2,416,236    Stillman et al.            Feb. 18, 1947

OTHER REFERENCES

Whitmore: Organic Chemistry (D. Van Nostrand, second edition, 1951), pages 288, 292–293, 299 and 450.